A. G. & E. G. SEBERG.
ORE SEPARATING MACHINE.
APPLICATION FILED OCT. 19, 1909.
964,567.
Patented July 19, 1910.
3 SHEETS—SHEET 3.
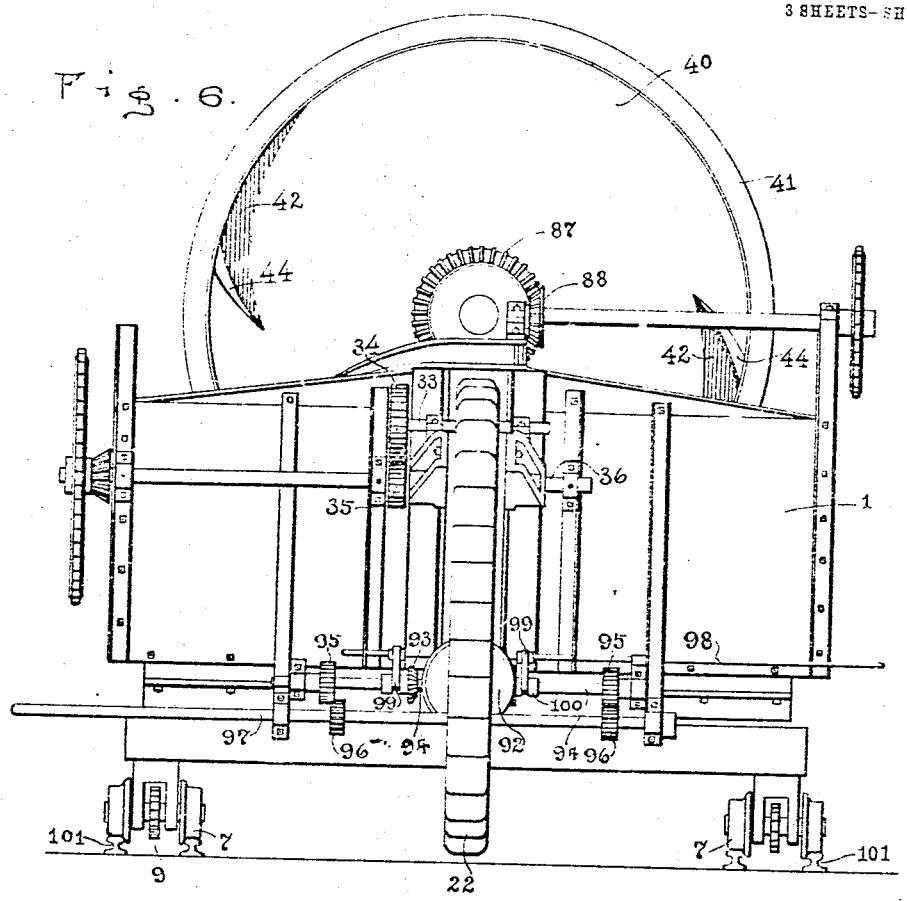
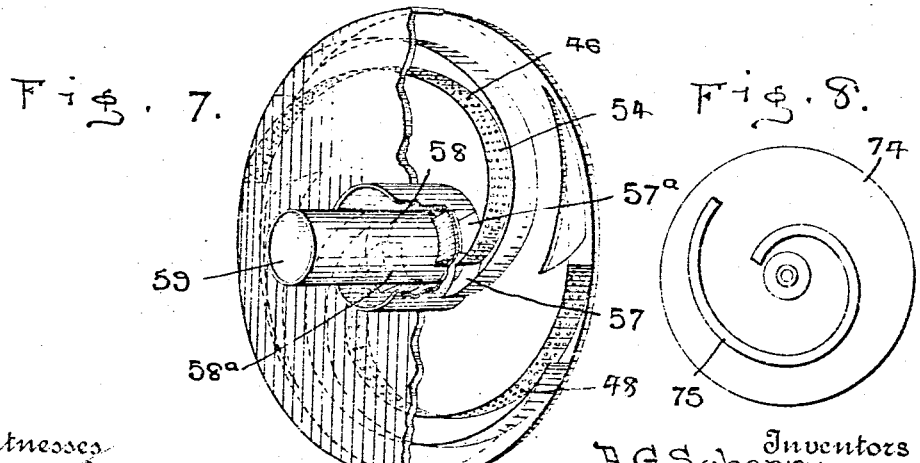
Witnesses
Gilbert F. Greene,
M. Newcomb.
Inventors
A. G. Seberg.
E. G. Seberg.
By W. J. Fitzgerald
Attorneys

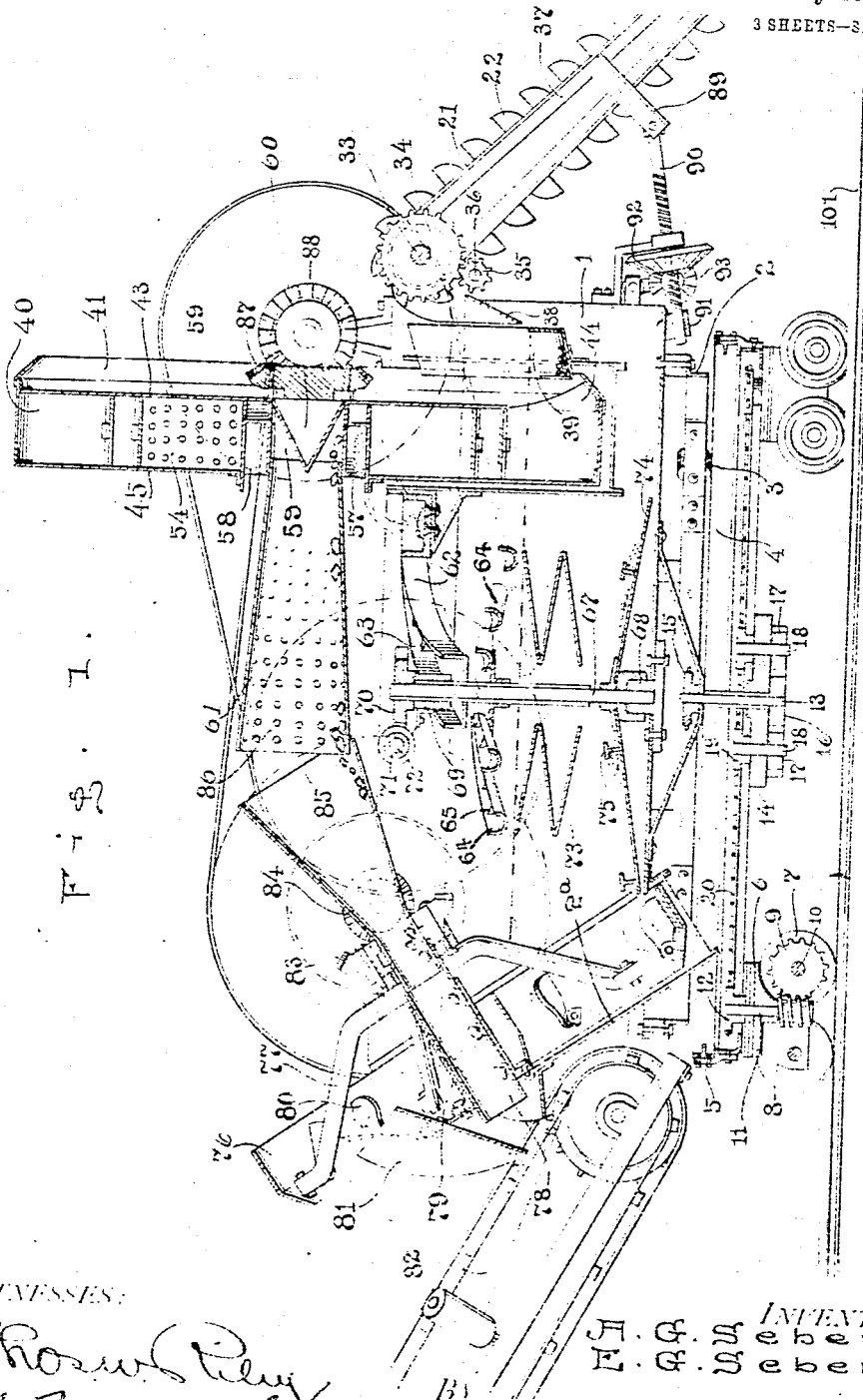

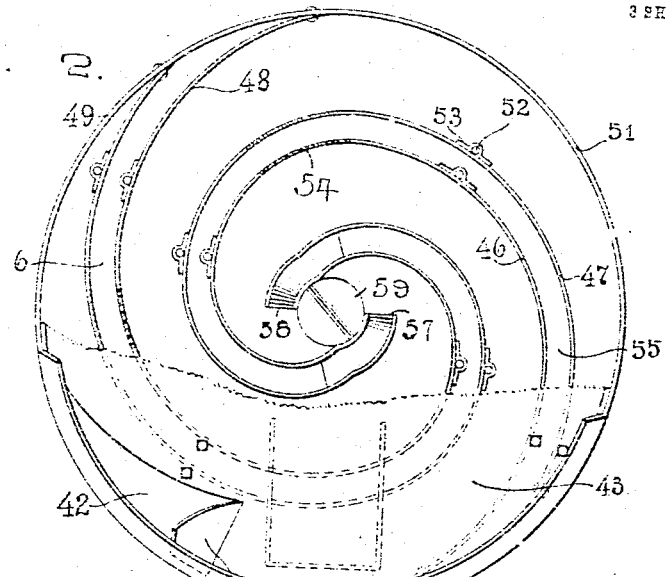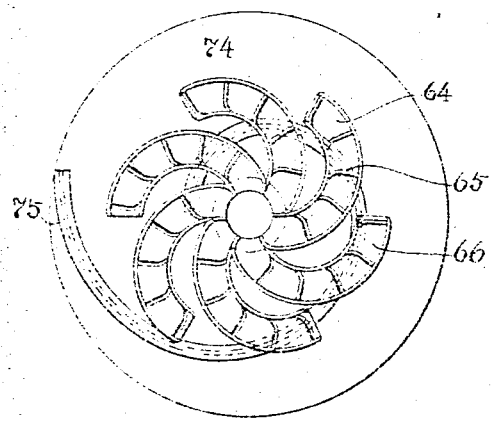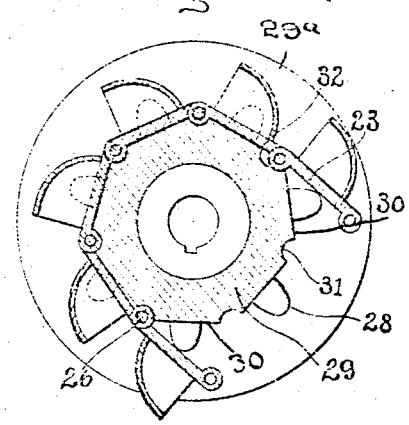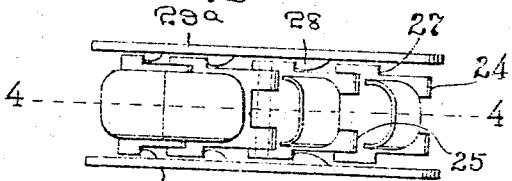

UNITED STATES PATENT OFFICE.

ARON G. SEBERG AND EDWIN G. SEBERG, OF RACINE, WISCONSIN.

ORE-SEPARATING MACHINE.

964,567. Specification of Letters Patent. Patented July 19, 1910.

Application filed October 19, 1909. Serial No. 523,452.

*To all whom it may concern:*

Be it known that we, ARON G. SEBERG and EDWIN G. SEBERG, citizens of the United States, residing at Racine, in the county of Racine and State of Wisconsin, have invented certain new and useful Improvements in Ore-Separating Machines; and we do hereby declare the following to be a full, clear, and exact description of the invention, such as will enable others skilled in the art to which it appertains to make and use the same.

Our invention relates to new and useful improvements in mining machines and more particularly to that class adapted to be used for placer mining and our object is to provide a suitable separating wheel for separating the larger from the smaller particles.

A further object is to provide means for digging the soil and conveying the same into the separating wheel.

A further object is to provide means for raising and lowering said digging device.

A further object is to provide means for conveying the smaller particles of the soil through a chute and onto a wheel comprised of eccentrically arranged troughs, said chute and troughs having riffles therein.

A further object is to direct the product after leaving the riffle wheel, over an amalgam plate and onto a revolving disk.

A further object is to provide means for conveying the larger foreign particles of the soil to a suitable discharging point.

A further object is to provide means for conveying the smaller foreign particles from the disk to a suitable discharging point.

A further object is to provide means for removing the smaller foreign particles from the disk.

A still further object is to provide suitable supporting trucks for the machine and a still further object is to provide a driving mechanism for said trucks, whereby the machine may be moved back and forth when desired.

In the accompanying drawings forming part of this application, Figure 1 is a longitudinal central sectional view through the machine. Fig. 2 is a detail elevation of the separating wheel, showing parts thereof broken away. Fig. 3 is a top plan view of the riffle wheel showing the disk in position below the same. Fig. 4 is a detail sectional view of the combined digger and elevator as seen on line 4—4 Fig. 5, Fig. 5 is a top plan view of the end of the digger, Fig. 6 is a front elevation of the machine, and, Fig. 7 is a perspective view partly in section of the separating wheel. Fig. 8 is a reduced top plan view of the rotatable disk with the spiral scraper as applied.

Referring to the drawings in which similar reference numerals designate corresponding parts throughout the several views, 1 indicates a tank, to the lower surface of which is secured a frame 2, to which are rotatably secured a plurality of rollers 3, said rollers in turn bearing on a track 4 carried by a platform 5.

Positioned below the platform 5 are trucks 6 which are preferably arranged in pairs at each end of the platform and swivelly mounted thereon, the wheels 7 being driven through the medium of a worm 8, which meshes with a gear 9 fixed to one of the axles 10, the worm 8 being attached to the lower end of a shaft 11, the upper end of which shaft forms a pivot for the truck and to said upper end is attached a sprocket 12.

Power is applied to the gears connected with the axles 10 in any preferred manner as by means of a driving shaft 13, which extends upwardly through a beam 14, the upper end of the driving shaft having a sprocket 15 thereon, through the medium of which power may be applied to the driving shaft, while to the lower end of said driving shaft is attached a gear 16, which meshes with gears 17 on auxiliary shafts 18, the upper ends of said auxiliary shafts having sprockets 19 thereon which engage a sprocket chain 20, said chain being in turn extended the full length of the platform 5 and around the sprockets 12 on the shafts 11, by which means the wheels of both trucks will be driven in unison. It will likewise be seen that should the chain 20 or other parts of the driving mechanism break, the worms and gears will act as a brake and will hold the axles and wheel attached thereto against rotation.

At one end of the tank 1 is a belt 21, which is formed by a plurality of buckets 22 and the bases 23 therefor, one end of each base having a pair of ears 24, while the opposite end of the base has recesses 25 to receive the ears of the next succeeding base and as the ears and that portion of the base having the recesses are provided with alining transversely extending openings, the introduction of a pin 26 through said opening will hingedly secure the bases together and form an endless belt, the buckets serving as diggers as well as carriers.

That portion of the base having the ears 24 is reduced in width to form shoulders 27, with which are adapted to engage tongues 28 carried by a bearing head 29, the periphery of said head being flattened to form a plurality of faces 30 and at the intersection of said faces are formed grooves 31, into which take the depending portions 32 of the ears 24 and the ends of the bases coöperating therewith, said depending portions and the grooves acting as a sprocket wheel and chain for driving the belt longitudinally, while the tongues 28 engaging the shoulders 27, removes a portion of the strain from the pins entering the openings in the base and ears. At the ends of the head 29 are guards 29$^a$ which serve to guide the belt and also prevent the soil from leaving the belt at the sides when being discharged from the buckets.

The head 29 is fixed to a rotating shaft 33 to which is attached a gear 34 and meshing with said gear is a pinion 35 attached to a shaft 36, said shaft being in turn attached to any suitable source of power and through this medium, the belt is driven longitudinally and in order to properly guide the belt and cause the same to engage the soil, said belt is directed over a frame 37, which frame is pivotally mounted on the shaft 33 and extends a distance therefrom.

The soil engaged by the buckets is carried upwardly and over the shaft 33 where it is deposited into a chute 38, from whence it descends into a receptacle 39, and thence into a separating wheel 40, said receptacle 39 being so arranged that any nuggets that may be contained in the soil, will be retained in said receptacle, that edge of the separating wheel adjacent the receptacle 39 having a conical flange 41 into which the contents of the receptacle are discharged and said contents are directed into the interior of the separating wheel by providing openings 42 at certain intervals in the face 43 and at one end of the opening is arranged a guide plate 44, which guide plate causes the product retained by the flange 41, to pass into the opening.

Positioned between the two walls 43 and 45 of the separating wheel 40 are spirally disposed plates 46, 47, 48 and 49, said plates being arranged in pairs and extended from a point adjacent the axial center of the separating wheel to the peripheral wall 51 thereof and said plates are held in their spirally arranged positions by introducing bolts 52 through clips 53 carried by said spiral plates, said bolts also extending through the front and rear walls of the separating wheel.

The spiral plate 46, which is paired with the plate 47 and the plate 48, which is paired with the plate 49, are provided with perforations 54, while the plates 47 and 49 are solid and when the separating wheel is rotated, the earth entering the openings 42 first encounters either the plate 46 or 48 and as said soil travels over said perforated plates, the finer particles thereof and the minerals contained therein, pass through said perforated plates and onto the solid plates 47 and 49, thereby separating the minerals and finer particles of the soil from the gravel, etc., contained in the soil.

The tank 1 contains a predetermined quantity of water and a stream of water is constantly flowing through the receptacle 39 and into the separating wheel, the water and finer particles of the soil passing through the channels 55 and 56 formed by the plates 46 and 47 and 48 and 49, respectively, the continued rotation of the wheel moving the product within the channels toward the axial center of the wheel, where it is discharged through ports 57 and 58 while the pebbles and larger foreign particles are moved over the surface of the perforated plates 46 and 48 and are discharged through ports 57$^a$ and 58 into a nozzle 59 at the axial center of the separating wheel, a suitable deflector 60 being provided to cause the gravel, etc., entering the nozzle, to move into a flared tube 61 extending horizontally from the nozzle.

As the finer products and minerals leave the ports 57 and 58, they are discharged into a chute 62, which is preferably inclined and provided with riffles 63, the outer end of the chute 62 terminating over a wheel which is composed of a plurality of troughs 64, which troughs are curved and tangentially arranged around the hub of the wheel and are also semi-circular in cross section, each of said troughs being provided with a plurality of riffles 65, which are so arranged as to provide substantially cup-shaped pockets 66.

The riffles 65 are concave and in view of the rotation of the wheel, the current will be stronger adjacent the ends of the riffles, while the current at the center of the riffles will be very slight, thereby causing a whirlpool at each riffle, which will cause the different minerals contained in the earth to separate from the soil or sand and the various minerals to separate from each other when the specific gravity of said minerals is different, the heavier minerals passing to the outer ends of the riffles and the lighter minerals being retained at the central portion of the riffles. In this manner, we are enabled to successfully separate refractory ore.

The troughs 64 are inclined from their inner to their outer ends and the wheel composed by said troughs, is mounted upon a shaft 67, the lower end of the shaft entering a socket 68 carried by the floor of the tank 1, while the upper end thereof projects through a bearing 69, the extreme upper end of the shaft having attached thereto a gear 70, which meshes with a worm 71 on a shaft 72, said shaft being connected to any suitable source of power, whereby motion is imparted to said shaft.

The sand and soil when leaving the troughs descend upon an amalgam plate 73 and after passing back and forth over the plate it is deposited upon a disk 74 attached to the lower portion of the shaft 67 and rotates therewith, the surface of said disk being preferably inclined.

In order to remove the sand, etc., deposited upon the disk and discharge the same at a predetermined point, a scraper 75, which is preferably T-shaped in cross section is positioned on the upper surface of the disk and remain stationary while the disk rotates and a said scraper is spirally arranged around the shaft 67, the sand, etc., will be gradually moved to the outer edge of the disk and discharged therefrom at a predetermined point.

At the point of discharge of the sand from the disk, is positioned a drum 76, said drum being preferably positioned at an incline so that the upper edge thereof will project beyond the end wall 2ᵃ of the tank 1, said drum being carried by any suitable form of rotating spider 77, which spider carries a tubular sleeve 78, which is surrounded by a similar sleeve 79 on the drum and as said spider is rotated, the drum will be correspondingly rotated.

The incline of the drum is such as to bring the inner edge thereof below the edge of the disk 74 and in order to carry the sand, etc. to a point adjacent the highest position reached by the drum, a plurality of blades 80 are pivotally mounted within the drum and in position to engage the sand as the drum revolves and carry the same upwardly, from whence the sand is discharged into a chute 81 and onto a belt 82.

The blades are hinged at one end adjacent one edge of the drum, so that when the blades have reached the point above the axis of the drum, said blades will swing downwardly and cause the sand to descend into the chute 81 and will swing in the opposite direction or against the inner face of the drum when the blades have passed to a point below the plane of the axis of the drum.

The spider 77 is rotated through the medium of a gear 83, which is attached to the hub of the spider and meshes with a similar gear 84, which latter gear is attached to any suitable source of power.

The pebbles and larger particles deposited in the tube 61 are moved to the outer end of the tube, where they are deposited in a funnel 85, which funnel communicates at its opposite end with the sleeve 78, so that the pebbles, etc., will pass through the drum and onto the belt 82, by which they are carried away from the machine and deposited at any suitable point.

The tube 61 is provided with a plurality of perforations 86, so that the stones, etc. passing through the tube will be thoroughly drained and should for any reason, any of the finer particles pass into the tube 61, they will readily descend through said perforations and enter the chute 62 or the troughs into which the contents of said chute is discharged, the tube being continually rotated by attaching the same to the nozzle of the separating wheel 40, said separating wheel being rotated through the medium of gears 87 and 88.

In order to raise and lower the outer end of the frame 37 carrying the buckets 22, a bracket 89 is attached to said frame and projects downwardly therefrom, a threaded shaft 90 being secured to the lower end of the bracket, while the opposite end of the shaft projects through a bearing 91 attached to the tank 1, the threaded portion of the shaft being engaged by an interiorly threaded bevel gear 92, with which mesh bevel pinions 93, and as said gear 92 is held against movement, it will be readily seen that the rotation of the gear will move the shaft 90 longitudinally and raise or lower the outer end of the frame 37, to bring the buckets on the frame in position to engage the soil.

The pinions 93 are mounted upon sliding shafts 94, which shafts are mounted in any suitable form of bearings and said shafts are driven through the medium of intermeshing cogs 95 and 96 positioned on the sliding shafts 94 and a driving shaft 97, respectively, the shaft 97 being attached to the source of power in any suitable manner.

The sliding shafts 94 are so arranged that when one of the pinions 93 is in engagement with the gear 92, the opposite pinion will be out of engagement therewith and said pinions are arranged a sufficient distance apart as to permit both pinions to be disengaged from the gear, at the same time, whereby the shaft will remain stationary.

Slidably mounted above the shafts 94 is a thrust rod 98, to which are attached a pair of bifurcated arms 99, the lower ends of said arms fitting between collars 100 on the sliding shafts and it will be readily seen that by moving said thrust rod longitudinally, either of the pinions 93 may be moved into or out of engagement with the gear 92.

In operation, the separator is moved over the tracks 101 until the earth and gravel containing the mineral deposits is reached, when the parts of the device carried by the trucks are swung to a position at right angles to that shown in the drawings, thus disposing the digging buckets at one side of the track-way and the carrying belt at the opposite side thereof. The driving power is then disengaged from the trucks and applied to the operating parts of the machine proper, the worms and gears on the trucks serving as brakes for holding the trucks in a fixed position. The thrust rod 98 is then operated to bring one of the pinions 93 into engagement with the gear 92 to lower the end of the frame 37 and bring the buckets into engagement with the soil, when power is applied to the mill proper, which will result in the buckets gathering the soil and depositing the same into the separating wheel 40 through the chute 38 and nugget receptacle 39, the water deposited in the receptacle separating and softening the soil and gravel to such an extent that they will readily separate, permitting the heavy nuggets to settle to the bottom of the receptacle 39, where they are retained, while the gravel, etc., will move into the channel formed by the flange 41, where it is gathered by the guide plates 44 and moved into the interior of the separating wheel 40. The soil is then gathered up by the plates within the separating wheel and the finer particles of the soil separated from the larger particles, the larger and smaller particles of the soil being moved toward the center of the wheel partially by gravity and partially by the force of the water within the wheel and when the wheel has been turned to a predetermined point, the smaller particles of the soil and minerals contained therein, together with the water, are discharged through the ports at the axial center of the separating wheel and into the chute 62, while the larger particles and pebbles are discharged into the tube 61, where they are cleaned by the rotation of the tube and moved to the outer end thereof, from whence they descend through the funnel 85 and sleeve 78 onto the belt 82, from whence they are carried to any suitable point to be discharged.

The finer particles of the soil and the minerals after entering the chute 62, descend in said chute and pass over the riffles, where a portion of the minerals is extracted from the soil, while the remaining portion of the minerals and soil pass into the troughs below the lower end of the chute and in view of the rotation of the troughs and the manner of placing the riffles therein, the major portion of the minerals is extracted from the soil and the different classes of minerals separated from each other. The soil is then passed over the amalgam plate and any metals remaining therein is separated from the soil in this manner. The soil then passes onto the disk 74 and is removed from the disk by the scraper 75 and discharged into the drum 76, the blades within said drum carrying the soil upwardly and discharging the same through the chute provided for receiving said soil.

Should the soil containing the minerals be shallow, the entire separator may be moved slowly on its track ways by applying power to the wheels, but otherwise the separator remains stationary while the buckets and frame carrying the same are gradually lowered until the mineralized soil is removed its full depth, when the end of the frame is to be again raised, the machine moved to a new position, and the same operation again performed. It will further be seen that by rotatably mounting the frame 2 upon the track 4 as shown, the buckets and frame carrying the same may be swung to opposite sides of the path of the machine, so that considerable surface may be covered without necessitating the moving of the machine. It will likewise be seen that by providing the tank and arranging the parts therein as shown, the water within the tank may be used a number of times.

What we claim is:

1. In a mining machine, the combination with a separating wheel; of a chute inclined downwardly from said separating wheel and adapted to receive the finer particles therefrom, said chute having a plurality of riffles thereon, a wheel composed of a plurality of trough-like members rotatably mounted upon a shaft just below the termination of said chute and adapted to receive the finer particles therefrom, said trough-like members also having riffles therein for the retention of the minerals, an amalgam plate below said trough-like members receiving the particles as they are thrown therefrom, a disk mounted on said shaft below said amalgam plate and receiving the soil therefrom, said disk rotating with said trough-like members and means to remove the soil from said disk and discharge the same at a predetermined point.

2. In a mining machine, the combination of a tank, a separating wheel rotatably mounted partially above and partially within said tank, said wheel being provided with pairs of spirally arranged plates, one plate of each pair being perforated, said wheel having means to separate the larger particles of soil from the smaller particles, means to remove minerals from the soil, a perforated tube adapted to receive the larger particles, a funnel adapted to receive the larger particles from said tube, a sleeve communicating with said funnel, a spider carrying said sleeve and funnel, a drum attached to said spider, swinging plates within said drum adapted to gather and remove the smaller particles of the soil, a wheel composed of a plurality of trough-like members, concave riffles in said troughs, means to convey the finer particles from the separating wheel to said trough-like members, and means to transfer said particles to said drum.

3. In a mining machine, the combination of a tank, a separating wheel rotatably mounted partially above and partially within said tank, said wheel having pairs of spirally arranged plates therein, one plate of each pair being perforated, said wheel having a flange around one edge thereof, means to deliver the soil into the channel formed by said flange, means adapted to separate the larger particles of soil from the smaller particles, means to remove minerals from the soil, a perforated tube adapted to receive the larger particles, a funnel adapted to receive the larger particles from said tube, a sleeve communicating with said funnel, a spider carrying said sleeve and funnel, a drum attached to said spider and swinging plates within said drum adapted to gather and remove the smaller particles of the soil, a second wheel composed of a plurality of trough-like members, means to rotate said trough-like members, concave riffles in said troughs, means to convey the finer particles of the soil from the separating wheel to the trough-like members, an amalgam plate below said trough-like members, a disk adapted to receive the soil when discharged from said amalgam plate, and means to remove said soil from said disk and discharge the same at a predetermined point, said drum being adapted to engage and remove the soil from said tank when discharged from said disk.

4. In a mining machine, the combination with a tank, a separating wheel in the upper portion of said tank, a chute leading from said separating wheel downwardly within said tank, a wheel mounted below the terminal of said chute and composed of trough-like members, an amalgam plate mounted below said trough-like wheel for receiving the products from said chute and wheel, a disk rotatably mounted in the bottom of said tank receiving the products from said plate and means to remove the products from said disk to a predetermined point; of additional means adapted to receive said removed products and elevate and discharge the same to a point without said tank.

5. In a mining machine, the combination with a tank and a separating wheel in the upper portion of said tank; of a chute leading downwardly into said tank from said wheel, a shaft extending vertically from the bottom of said tank to a point adjacent the terminal of said chute, a wheel composed of trough-like members mounted on said shaft immediately below said chute, an amalgam plate below said trough-like wheel, a disk mounted on said shaft adjacent the lower portion, means to rotate said shaft and additional means to remove the products received on said disk, from the chute, trough-like wheel and amalgam plate to a predetermined point.

In testimony whereof we have signed our names to this specification in the presence of two subscribing witnesses.

ARON G. SEBERG.
EDWIN G. SEBERG.

Witnesses:
H. C. CASE,
J. H. PAINTER.